United States Patent [19]

Miyadera

[11] Patent Number: 5,034,768
[45] Date of Patent: Jul. 23, 1991

[54] AUTOMATIC FOCUSING DEVICE FOR A CAMERA

[75] Inventor: Shunichi Miyadera, Tokyo, Japan

[73] Assignee: Asahi Kogaku Kogyo Kabushiki Kaisha, Tokyo, Japan

[21] Appl. No.: 486,159

[22] Filed: Feb. 28, 1990

[30] Foreign Application Priority Data

Mar. 3, 1989 [JP] Japan ................... 1-51730

[51] Int. Cl.$^5$ .............................................. G03B 13/00
[52] U.S. Cl. ...................................... 354/400; 354/403
[58] Field of Search ................................. 354/400–409

[56] References Cited

U.S. PATENT DOCUMENTS

| 4,320,946 | 3/1982 | Aoki et al. | 354/402 |
|---|---|---|---|
| 4,344,679 | 8/1982 | Yagi et al. | 354/409 |
| 4,545,665 | 10/1985 | Aihaia | 354/402 |
| 4,571,046 | 2/1986 | Suzuki et al. | 354/400 |
| 4,627,700 | 12/1986 | Nakamura et al. | 354/409 |

Primary Examiner—L. T. Hix
Assistant Examiner—David M. Gray
Attorney, Agent, or Firm—Sandler, Greenblum & Bernstein

[57] ABSTRACT

An automatic focusing device for a camera comprises a distance measuring mechanism for calculating the distance to an object by performing distance measurement a plurality of times and a focusing lens driving mechanism for moving a focusing lens to a position where it is focused on the object on the basis of the object distance calculated by the distance measuring mechanism. A field depth detecting device for detecting the depth of field of a photographing lens is provided. A device setting the number of times that distance measurement is performed by the distance measuring mechanism in accordance with the depth of field detected by the field depth detecting device is provided in such a manner that, if the depth of field detected is relatively great, the number of times that distance measurement is performed is set to a relatively small number, whereas, if the depth of field detected is relatively shallow, the number of times that distance measurement is performed is set to a relatively large number.

18 Claims, 3 Drawing Sheets

AUTOMATIC FOCUSING DEVICE FOR A CAMERA

BACKGROUND OF THE INVENTION

1. Field of the Invention

The present invention relates to an automatic focusing device for a camera having a zoom lens.

2. Description of Related Art

Recently developed cameras, particularly so-called compact cameras, are generally equipped with a zoom lens and an automatic focusing device as standard constituent elements.

A typical conventional automatic focusing device comprises a distance measuring device for measuring the distance to an object and a focusing lens driving device for moving a focusing lens to a position where the lens is focused on the objects at the distance measured in the distance measuring device. The distance measuring device is, generally, activated to begin a distance measuring operation when the release button is depressed halfway. The distance measuring device repeatedly projects light and performs calculations for distance measurement a predetermined number of times (about 5 to 8 times) to obtain an average value of the object distance values. The focusing lens driving device moves the focusing lens to a position where the lens is focused on the object at the average distance value thus obtained.

Thus, the conventional cameras perform the distance measuring operation repeatedly and therefore take a long time to complete focusing.

In the meantime, the photographing lens has such a depth of field that, even if the lens is not exactly focused, it can be virtually regarded as focused.

As is generally known, depth of field has the nature that the shorter the focal length, the greater the depth of field. The depth of field also has the nature that the larger the aperture value (F-number), the greater the depth of field. In other words, in the same zoom lens the depth of field at the wide-angle end (the shortest focal length) is greater than that at the telephoto end (the longest focal length).

Accordingly, it is necessary in order to measure a precise object distance, execute the of distance measurement at the telephoto and more times than at the wide-angle end.

However, in conventional automatic focusing device, the number of times of execution of distance measurement is fixed irrespective of the depth of field. Accordingly, if the number of times of execution of distance measurement is set in conformity to the telephoto end, at the wide-angle end distance measurement is needlessly performed and the time required for focusing therefore becomes needlessly longer. Moreover, more current is consumed than is actually needed. On the other hand, if the number of distance measurements is set in conformity to the wide-angle end, the number of measurements is insufficient to attain precise focusing at the telephoto end.

SUMMARY OF THE INVENTION

The primary object of the present invention is to shorten the time required for focusing and reduce the consumed current in a camera having an automatic focusing device.

The present invention was made by noting that, even if the lens is not focused in the strict sense of the word, it can be virtually regarded as focused as long as the error in distance measurement falls within the depth of field.

To attain the above-described object, the present invention comprises a distance measuring mechanism for calculating the distance to an object by performing distance measurement a plurality of times, focusing lens driving means for moving a focusing lens to a position where it is focused on the object on the basis of the object distance calculated by the distance measuring mechanisms and a field depth detecting mechanisms for detecting the depth of field of a photographing lens. Means are provided for setting the number of times of distance measurement which is to be carried out by the distance measuring mechanism in accordance with the depth of field detected by the field depth detecting mechanism. For example, if the depth of field detected is relatively great, the number of executions of distance measurement is set to a relatively small number, whereas, if the depth of field detected is relatively shallow, the number of executions of distance measurement is set to a relatively large number.

By virtue of the above-described arrangement, if the depth of field detected is relatively shallow, the number of times of execution of distance measurement is set to a relatively large number, whereas, if the depth of field detected is relatively great, the number of distance measurements is set to a relatively small number. It is therefore possible to effect distance measurement efficiently without waste. In a region where the depth of field is great, the number of executions of distance measurement decreases to shorten the time required for focusing, whereas, in a region where the depth of field is shallow, the number of distance measurements increases to enable precise focusing.

DESCRIPTION OF PREFERRED EMBODIMENTS

Figure 1:
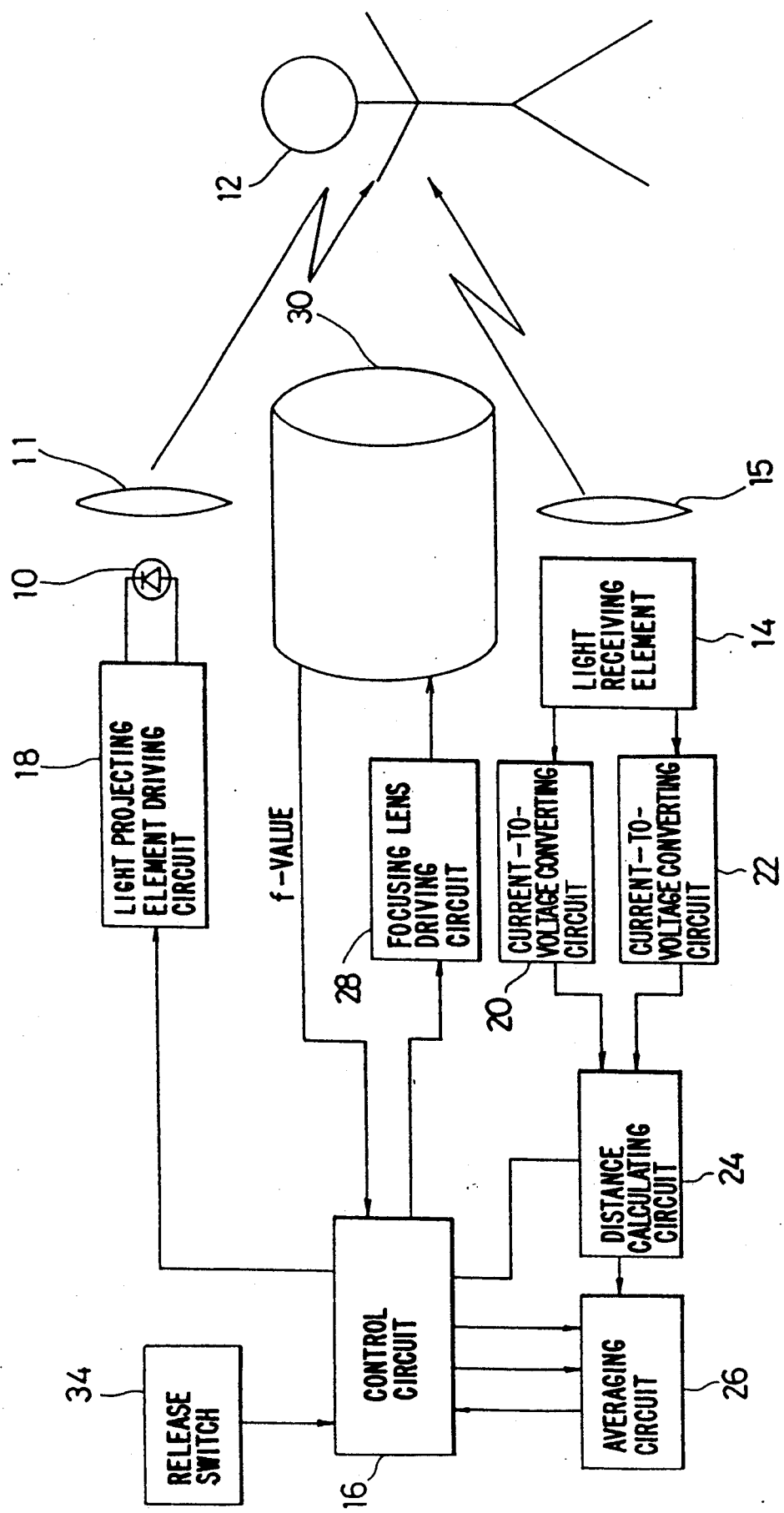
FIG. 1 is a block diagram schematically showing the constituent elements of the focusing device for a camera according to the present invention.

The present invention will be described below on the basis of the embodiment illustrated in the drawings. FIG. 1 is a block diagram showing the arrangement of a compact camera having a zoom lens and automatic focusing device to which the present invention is applied.

The automatic focusing device of this camera, which is of the so-called active focusing type, has a light projecting element 10 which projects infrared light for distance measurement and a light receiving element (PSD) 14 which receives the infrared light projected from the light projecting element 10 and reflected from an object 12. The light projecting element 10 is driven by a light projecting element driving circuit 18 which is controlled by a control circuit 16. A pair of output of the light receiving element 14 are inputted to current to voltage converting circuits 20 and 22, respectively. It should be noted that, in the figure, the reference numeral 11 denotes a lens through which the infrared light for distance measurement is formed into parallel rays, and 15 a lens through which the infrared light reflected from the object 12 is converged on the light receiving element 14.

The output voltages from the current-to-voltage converting circuits 20 and 22 are inputted to a distance calculating circuit 24. The circuit 24 executes a predetermined calculation based on the trigonometrical measurement on the basis of the difference between the pair of voltages representative of distance information to obtain a distance (object distance) and outputs it to an averaging circuit 26. The averaging circuit 26 executes an averaging processing every time a distance signal is output from the distance calculating circuit 24, and stores in memory the result of the processing. When a predetermined number of object distance signals are consecutively output from the distance calculating circuit 24, the averaging circuit 26 output an average value of these object distance signals to the control circuit 16. The above-described members constitute in combination the distance measuring means for measuring the distance to an object.

The control circuit 16 moves the focusing lens (not shown) of a zoom lens 30 through a focusing lens driving circuit 28 on the basis of the above-described average object distance value so that the focusing lens is focused on the object (i.e., subject 12) at the position of the average distance value. The control circuit 16 and the focusing lens driving circuit 28 constitute in combination the focusing lens driving means.

Figure 2:
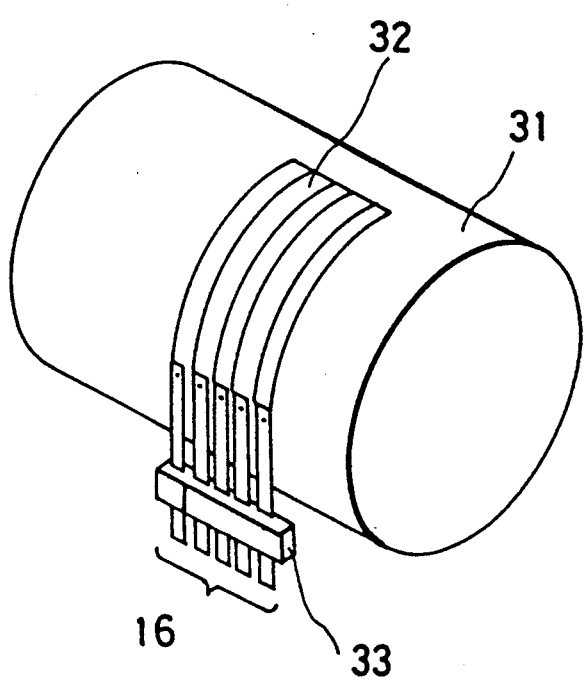
FIG. 2 is a perspective view showing a structure for reading the focal lenght of the zoom lens.

The zoom lens 30 is designed so that the focal length is varied by the rotational or straight motion of a zoom ring. It should be noted that this zoom lens is arranged to stop at a plurality of predetermined positions so as to change the focal lenght stepwise. The focal lenght (f-value) is read by a known focal lenght reading means and is then output to the control circuit 16. One example of the focal length reading means is shown in FIG. 2. In this embodiment, a zoom ring 31 which performs rotational motion has a code plate 32 attached to the outer peripheral surface thereof, the code plate 32 having coded information representative of the focal lenght at each of the stop positions. In addition, a brush 33 is secured to a stationary part in such a manner that the brush 33 is in sliding contact with the code plate 32 to read the focal length (f-value) at each of the stop positions of the zoom ring 31.

The control circuit 16 fetches focal lenght (f-value) information from the zoom lens 30 to control the number of light emissions by the light projecting element 10 and also control the distance calculating circuit 24 and the averaging circuit 26 which are related thereto. More specifically, the control circuit 16 sets the number n of times of distance measurement which has previously been determined in correspondence with the focal lenght (f-value) and activates the light projecting element 10 to project light n times. The control circuit 16 activates the distance calculating circuit 24 in accordance with each projection of infrared light for distance measurement, and when the distance calculating circuit 24 output n object distance signals consecutively, the control circuit 16 instructs the averaging circuit 26 to execute an averaging process and output the result of the average to the control circuit 16.

The control circuit 16 is further supplied with a signal from a release switch 34. The release switch 34 is a two-step switch, as is generally known, which is designed so that, when it is depressed halfway, the distance measurement switch turns on to initiate a distance measuring operation, and when the release switch 34 is totally depressed, the release switch turns on to initiate a release operation.

Figure 3:
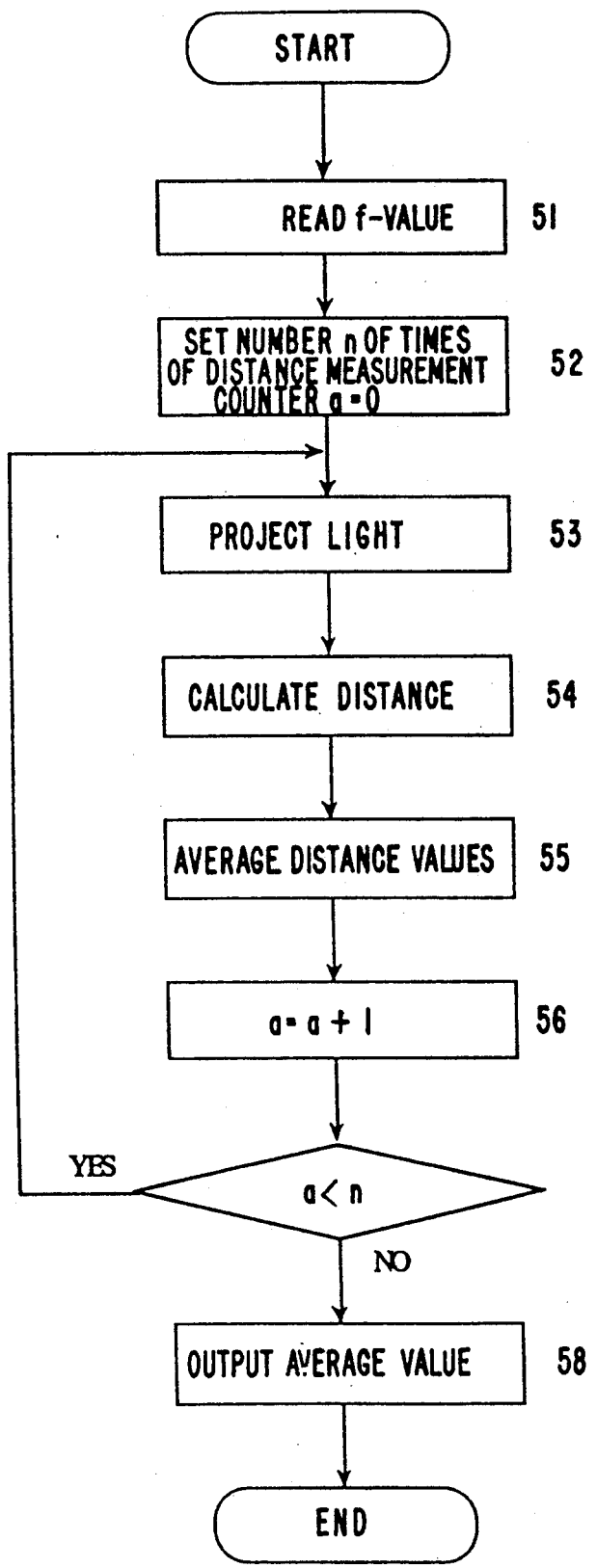
FIG. 3 is a flowchart concerning the distance measuring operation of this embodiment.

The distance measuring operation of the embodiment described above will further be explained with reference to the flowchart shown in FIG. 3. The operation is controlled according to a control program stored in a ROM incorporated in a CPU constituting the control circuit 16.

The distance measuring routine is entered when the release switch 34 is depressed halfway. When the distance measuring routine is entered, an f-value is first read from the zoom lens 30, and then the number n of times of distance measurement corresponding to the read f-value is set and the distance measurement counter a is reset (Steps 51 and 52). The number n of times of distance measurement has previously been set in correspondence to the depth of field of the zoom lens 30 at each focal lenght (f-value), for example, as follows:
when f=35 mm, 3 times
when f=50 mm, 6 times
when f=70 mm, 8 times.

Upon completion of the above-described setting and resetting, the control circuit 16 activates the light projecting element 10 to emit light and also instructs the distance calculating circuit 24 to execute a distance calculating operation in synchronism with the emission of light (Steps 53 and 54). When the infrared light for distance measurement projected from the light projecting element 10 is reflected from the object 12 and received by the light receiving element 14, the distance calculating circuit 24 performs the calculation for distance measurement on the basis of the output from the current to voltage converting circuits 20 and 22 and ouputs the the calculated distance value to the averaging circuit 26, in which the distance value is subjected to an averaging processing. It should be noted that the averaging circuit 26 stores in memory the distance value first inputted thereto without subjecting it to calculation and thereafter executes calculation every time a distance value is inputted thereto and stores in memory the result of calculation.

Thereafter, the control circuit 16 increases the count value a by 1 (Step 56). Then, the control circuit 16 compares the count value a with the set value n. If the count value a is smaller than the set value n, the control circuit 16 returns to Step 53 and repeats the above-described processing.

Upon completion of the n times of projection of light, reception of light and calculation for distance measurement, the averaging circuit 26 outputs an average value of the n distance values to the control circuit 16, thereby completing the distance measuring processing (Step 58).

The control circuit 16 moves the focusing lens of the zoom lens 30 to a predetermined position through the focusing lens driving circuit 28 on the basis of the average distance value, thus focusing the focusing lens on the object 12.

Thus, the operation of the automatic focusing device is completed. If, in this state, the release switch 34 is totally depressed, the control circuit 16 executes the normal shutter release processing, thereby forming the image of the object 12 on the film by light exposure.

Thus according to this embodiment, distance measurement is executed in accordance with the depth of field of the zoom lens 30. That is, at the wide-angle end where the depth of field is great, the number of times of execution of distance measurement is reduced, so that distance measurement is completed within a relatively short period of time and the consumed current is reduced. On the other hand, at the telephoto end where the depth of field is shallow, the number of times of execution of distance measurement is increased to enable precise distance measurement.

As has been described above, in this embodiment the number of times of execution of distance measurement is determined by detecting the focal length, noting that the focal lenght and the depth of field have a fixed relationship to each other. However, the depth of field also changes with the apeture value (F-number). Accordingly, it is also possible to determine the number of times of execution of distance measurement by detecting the apeture value (F-number). In short, it is only necessary in the present invention to determine the number of times of execution of distance measurement so that an expected error in distance measurement will fall within the depth of field.

As will be clear from the foregoing description, in the automatic focusing device for a camera according to the present invention, the number of times of execution of distance measurement is determined in accordance with the depth of field of the photographing lens. Accordingly, when the depth of field is great, the number of times of execution of distance measurement is reduced, so that distance measurement is completed within a relatively short period of time and the current consumed is reduced, whereas, when the depth of field is shallow, the number of times of execution of distance measurement is increased so as to be relatively large, thereby enabling precise distance measurement.

I claim:

1. An automatic focusing device for a camera comprising:
    distance measuring means for calculating the distance to an object by performing distance measurement a plurality of times;
    focusing lens driving means for moving a focusing lens to a position where the lens is focused on the object on the basis of the object distance calculated by said distance measuring means;
    field depoth detecting means for detecting the depth of field of a photographing lens; and
    means for setting the number of times that distance measurement is performed by said distance measuring means in accordance with the depth of field detected by said field depth detecting means.

2. An automatic focusing device for a camera according to claim 1, wherein the number of times that distance measurement is performed is set to a small number when the depth of field detected is deep.

3. An automatic focusing device for a camera according to claim 1, wherein the number of times that distance measurement is performed is set to a large number when the depth of field detected is shallow.

4. An automatic focusing device for a camera according to claim 1, wherein the number of times that distance measurement is performed is set to a small number when the depth of field detected is deep, whereas, the number of times that distance measurement is performed is set to a large number when the depth of field detected is shallow.

5. An automatic focusing device for a camera according to claim 1, wherein said field depth detecting means comprises a focal length detecting means for detecting the focal length of said photographing lens.

6. An automatic focusing device for a camera according to claim 1, wherein said field depth detecting means comprises an apeture detecting means for said photographing lens.

7. An automatic focusing device for a camera according to claim 1, wherein said photographing lens is a zoom lens.

8. An automatic focusing device for a camera according to claim 1, wherein said photographing lens is a multi-focal lenght lens.

9. An automatic focusing device for a camera comprising:
    distance measuring means for calculating the distance to an object by performing distance measurement a plurality of times;
    focusing lens driving means for moving a focusing lens to a position where the lens is focused on the object on the basis of the object distance calculated by said distance measuring means;
    focal length detecting means for detecting the focal length of a photographing lens; and
    means for setting the number of times that distance measurement which is to be carried out by said distance measuring means in accordance with the depth of field detected by said focal length detecting means.

10. An automatic focusing device for a camera according to claim 9, wherein said means for setting the number of times that distance measurement is performed sets large number of distance measurement when focal length of said photographing lens is long.

11. An automatic focusing device for a camera according to claim 9, wherein said means for setting the number of times that distance measurement is performed sets small number of distance measurements when focal length of said photographing lens is short.

12. An automatic focusing device for a camera according to claim 9, wherein said means for setting the number of times that distance measurement is performed sets large number of distance measurements when focal length of said photographing lens is long, whereas, said means for setting the number of times that distance measurement is performed sets small number of distance measurements when focal length of said photographing lens is short.

13. An automatic focusing device for a camera according to claim 9, wherein said photographing lens is a zoom lens.

14. An automatic focusing device for a camera according to claim 13, wherein the focal length range of said zoom lens is divided into plural ranges so that said means for setting the number of times that distance measurement is performed sets the number of times that distance measurement is performed for each of said plural ranges of focal length.

15. An automatic focusing device for a camera according to claim 14, wherein said means for setting the number of times that distance measurement is performed sets the number of times distance measurement so that the distance measurement error expected in each of said plural ranges of focal lenght is within the range depth of field.

16. An automatic focusing device for a camera according to claim 16, wherein said means for setting the number of times that distance measurement is performed sets the number of times that distance measurement is performed for each of said plural focal lenght.

17. An automatic focusing device for a camera according to claim 16, wherein means for setting the number of times of execution of distance measurement sets the number of times of execution of distance measurement respectively for each of said plural focal length.

18. In a camera having a lens and an automatic focusing device that determines the object distance by measuring the distance to an object to be photographed a plurality of times n, said camera including means for varying n in accordance with the depth of field, and means for adjusting the camera lens to focus on an object at the measured distance upon the completion of n measurements.

* * * * *

UNITED STATES PATENT AND TRADEMARK OFFICE
CERTIFICATE OF CORRECTION

PATENT NO. : 5,034,768
DATED : July 23, 1991
INVENTOR(S) : S. MIYADERA

It is certified that error appears in the above-indentified patent and that said Letters Patent is hereby corrected as shown below:

At column 5, line 44 (claim 1, line 10), change "depoth" to ---depth---.
At column 6, line 10 (claim 8, line 3), change "lenght" to ---length---.
At column 6, line 30 (claim 10, line 4), change "measurement" to ---measurements---.
Column 6, line 62, change "lenght" to --length---.
Column 6, line 68, change "lenght" to ---length---.

Signed and Sealed this

Sixteenth Day of August, 1994

Attest:

BRUCE LEHMAN

*Attesting Officer*  *Commissioner of Patents and Trademarks*